June 11, 1929.  R. GOTZ  1,717,204
NEEDLE BEARING
Filed March 25, 1925
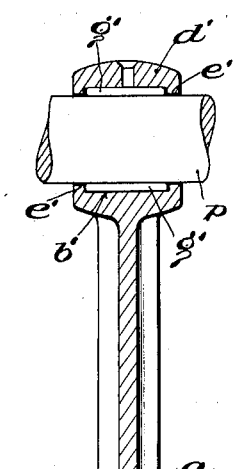
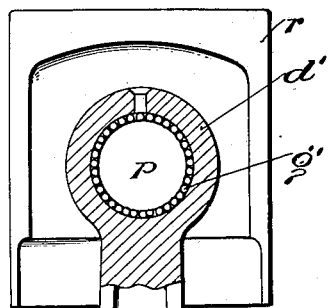
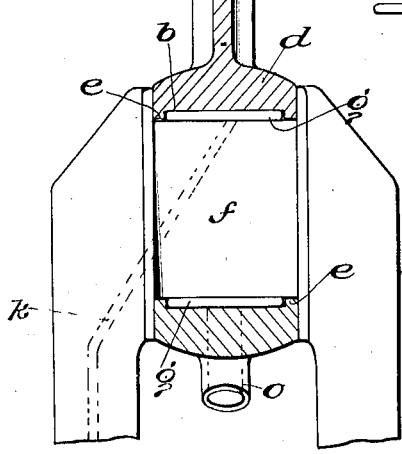
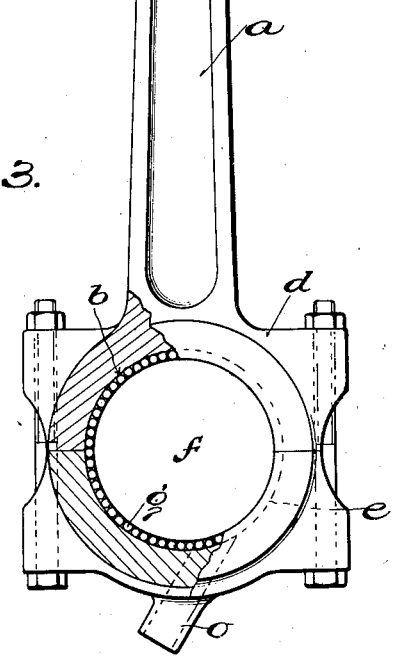
Inventor
Richard Gotz.
By Ferd Nusch
Attorney Patented June 11, 1929.

1,717,204

UNITED STATES PATENT OFFICE.

RICHARD GÖTZ, OF BERLIN-GROSS LICHTERFELDE, GERMANY.

NEEDLE BEARING.

Application filed March 25, 1925. Serial No. 18,179.   REISSUED

This invention relates to bearings, and more particularly to a novel form of high-speed bearing.

Due to the great centrifugal force and the heavy pressures which occur on change of direction of the masses on the crank pins, when the connecting rod and piston of high speed internal combustion engines are at their dead centres, the oil does not remain in the bearings, so that firing of the crank pin takes place. For this reason sliding bearings can only be used with engines the speed of rotation of which is not very high.

Bearings suitable for the connecting rods of high speed engines should possess the following characteristics:—small oil requirements, the minimum friction i. e., high mechanical efficiency, large bearing surface i. e. small specific bearing pressure, and small weight. So-called basket- or cage-bearings consequently cannot be used for crank pins, because the centrifugal forces arising would damage the basket or cage very rapidly. Moreover, their dimensions are too great, and due to the swinging movement of the connecting rod the masses of the rolling intermediate members, balls, rollers, rolls, basket and cage are alternately accelerated and retarded. As a result rollers, roll- and ball-bearings cannot be used for connecting rods of the modern high speed engines such as are mainly employed in automobiles.

The subject of the present invention is a bearing and lubricating means which avoids the disadvantage mentioned above and moreover can be fitted to existing engines without difficulty. The new bearing consists of a bearing shell made up of multiple sections between the axle pin and the connecting rod, the separate parts of which consist of rods of small diameter of the order or size of piano wire contacting with one another so as to form in normal running a sliding bearing or a sliding sleeve freely rotating about the axle, and of which only a few, at times of overload, have a rotation of their own. The new bearing thus constitutes a sliding- and a rolling-bearing.

The opening in the small end and the big end of the connecting rod are so formed as to provide at the sides thereof inwardly projecting edges which limit the seating for the rods and also form oil reservoirs in which the rods are disposed.

The use in a roller bearing of rods of small diameter in relation to their length is not of course new. For instance in the bearings for the drawing rollers for spinning machines such a form of bearing has been suggested the rods, however, being arranged as a sleeve or cage with play between them.

A connecting rod with the improved bearing and lubrication is shown, by way of example, on the accompanying drawings, in which Fig. 1 is a longitudinal section and
Fig. 2 a side elevation partly in section.
Figs. 3 and 4 show each one of the needles used in the head eye and foot eye respectively.

The divided head $d$ of the connecting rod $a$ has a bore which, except at a narrow annular flange $e$ at either side, is of greater diameter than the diameter of the axle pin $f$. A recess $b$ is thus formed into which the needles $g$ are inserted which are made from piano wire, silver wire or from structural-steel, tempered and polished, and which fit just between the flanges $e$. These needles $g$ (Fig. 3) are in close contact with one another owing to their very little diameter compared with the length (2 to 5 mm. according to the diameter of the pin) and under normal loads press with such friction on one another that they do not rotate about their own axes and thus with the usual bearing pressure the needles form a closed unit, i. e., a sliding bearing shell rotating freely about the crank pin $f$ only with occasional overloads, i. e., at the commencement of the explosion period, the pressure upon some of the needles, which are just exposed to the stress, becomes so great that they are carried round by the connecting rod head $d$ and execute an individual rotation or rolling action.

Oil is supplied into the recess $b$—at splash-lubrication—from the tubular socket $o$, or—at pressure lubrication—the oil is forced from the channel $k$ in the axle pin $f$ into the groove $b$ (Fig. 1). The annular space $b$ is in any case filled with oil which remains in the same owing to the inwardly projecting flanges $e$. The oil cannot be thrown out and remains in the annular space even when the engine is stopped so that the rod is always abundantly lubricated.

The bolt $p$ of piston $r$ is also surrounded by needles $g'$ (Fig. 4) forming a kind of sliding sleeve and located in a recess $h'$ of the foot eye $d'$. By the projecting flanges $e'$ an oil reservoir is formed.

I claim:—

1. In a bearing, the combination of relatively rotatable cylindrical bearing races and a plurality of cylindrical needles interposed therebetween, such needles forming a closed ring or sleeve, which is compelled to revolve as an entirety in the same direction as the driving bearing member, without each single cylindrical needle being constrained to turn around itself.

2. In a bearing, the combination of relatively rotatable cylindrical bearing members, an intermediate bearing sleeve which revolves as an entirety and which includes a plurality of slidable bearing elements, said elements cooperating with each other and with the cylindrical bearing members to draw in and hold lubricant in wedge-shaped form between the elements and the bearing members.

3. In a bearing, the combination of relatively rotatable cylindrical bearing elements and an intermediate bearing sleeve which revolves as an entirety and which includes a plurality of independently movable slidable bearing elements with capillary spaces therebetween in which suction is produced by the cooperation of the bearing elements.

4. In a bearing, the combination of relatively rotatable cylindrical bearing races and a plurality of cylindrical needles interposed therebetween, the clearances between the needles and the races being such that the needles normally have a sliding action on the races and are compelled to roll only when subjected to peak load pressure.

5. In a bearing, the combination of relatively rotatable cylindrical bearing races and a plurality of cylindrical needles interposed therebetween, the needles being of sufficient length to secure by their line of contact a braking action between each other which normally prevents the needles from assuming a rolling action from the driving bearing member.

In testimony whereof I affix my signature.

RICHARD GÖTZ.